United States Patent
Jung

(10) Patent No.: US 10,342,112 B2
(45) Date of Patent: Jul. 2, 2019

(54) SATELLITE-SHAPED FLEXIBLE PLASMA GENERATOR

(71) Applicant: AGENCY FOR DEFENSE DEVELOPMENT, Daejeon (KR)

(72) Inventor: Hee-Soo Jung, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 0 days.

(21) Appl. No.: 15/938,051

(22) Filed: Mar. 28, 2018

(65) Prior Publication Data

US 2019/0090337 A1    Mar. 21, 2019

(30) Foreign Application Priority Data

Sep. 18, 2017  (KR) .................. 10-2017-0119692

(51) Int. Cl.
| | | |
|---|---|---|
| B08B 5/00 | (2006.01) | |
| H05H 1/24 | (2006.01) | |
| B01J 19/08 | (2006.01) | |

(52) U.S. Cl.
CPC .......... *H05H 1/2406* (2013.01); *B01J 19/088* (2013.01); *B01J 2219/0807* (2013.01); *B01J 2219/0871* (2013.01); *B01J 2219/0896* (2013.01); *B08B 5/00* (2013.01); *H05H 2001/2412* (2013.01); *H05H 2001/2431* (2013.01)

(58) Field of Classification Search
CPC ......... H05H 1/2406; H05H 2001/2431; H05H 2001/2412; B01J 19/088; B01J 2219/0871; B01J 2219/0807; B01J 2219/0896; B08B 5/00; H01J 19/36; H01J 23/033

See application file for complete search history.

(56) References Cited

U.S. PATENT DOCUMENTS

| | | | | |
|---|---|---|---|---|
| 2002/0175068 | A1* | 11/2002 | Hammerstrom | A61L 2/14 204/164 |
| 2003/0235694 | A1* | 12/2003 | Winther-Jensen | C08F 2/52 428/422.8 |
| 2011/0022043 | A1* | 1/2011 | Wandke | A61N 1/40 606/41 |
| 2011/0301412 | A1* | 12/2011 | Cho | A61B 1/00091 600/104 |
| 2013/0330243 | A1* | 12/2013 | Fietzek | C01B 13/11 422/186.18 |
| 2016/0208397 | A1* | 7/2016 | Ohno | C25B 11/02 |
| 2016/0262251 | A1* | 9/2016 | Jung | H05H 1/24 |

(Continued)

FOREIGN PATENT DOCUMENTS

| | | | |
|---|---|---|---|
| EP | 3220725 A1 * | 9/2017 | |
| JP | 06-188492 A | 7/1994 | |
| JP | 2003-022784 A | 1/2003 | |

(Continued)

*Primary Examiner* — Joseph L Williams
*Assistant Examiner* — Jose M Diaz
(74) *Attorney, Agent, or Firm* — LRK Patent Law Firm

(57) ABSTRACT

A linear flexible plasma generator having a function of cooling and temperature control. More efficient power control is possible, since a temperature of an electrode itself can be controlled in a state when plasma is discharged. In addition, since a temperature of the electrode surface can be decreased, use for the purposes of sterilization, neutralization, treatment, beauty treatment, and so on is possible.

16 Claims, 17 Drawing Sheets

(56) References Cited

U.S. PATENT DOCUMENTS

2017/0136252 A1* 5/2017 Weltmann ................ A61N 1/44
2017/0182342 A1* 6/2017 Park ......................... A61L 2/14

FOREIGN PATENT DOCUMENTS

| | | |
|---|---|---|
| JP | 2008-034184 A | 2/2008 |
| JP | 2008-130343 A | 6/2008 |
| KR | 20050066233 A | 6/2005 |
| KR | 20050094089 A | 9/2005 |
| KR | 10-1492864 B1 | 2/2015 |
| KR | 10-1573231 B1 | 12/2015 |
| KR | 20160134593 A | 11/2016 |

* cited by examiner

SATELLITE-SHAPED FLEXIBLE PLASMA GENERATOR

CROSS REFERENCE TO RELATED APPLICATION(S)

This application claims the benefit of Korean Patent Application No. 10-2017-0119692, filed Sep. 18, 2017, which is hereby incorporated by reference in its entirety into this application.

BACKGROUND OF THE INVENTION

1. Technical Field

The present disclosure relates to a flexible plasma generator that is temperature controllable and has a satellite shape when viewed cross-sectionally. More particularly, the present disclosure relates to flexible plasma generator that can be cooled and has a satellite shape when viewed cross-sectionally.

2. Description of Related Art

Differently from a vacuum plasma used for a purpose of etching or cleaning, an atmospheric plasma that discharges electricity in an open space (1 atm) has been studied much since the 1990s. Depending on a structure or a mode of electric discharge, the atmospheric plasma is variously classified into a dielectric barrier discharge (DBD), a corona jet, a glow discharge, an arc torch, a micro hollow cathode discharge (MHCD), an inductively coupled plasma (ICP), and so on. At this time, plasmas of which physical and chemical characteristics are different may be generated through adjustments of input voltage, input current, input waveform, gas supply, and so on. Because of such various characteristics of plasma, various applied research on plasma in the bio and medicine industry, the material industry, the energy and environmental industry, etc. as well as basic research are actively underway globally.

When voltage is applied to two electrodes separated from each other at a predetermined distance, ionization of reaction gases is achieved by electric discharge in a space between the two electrodes, thereby generating plasma. The various functional ions included in the plasma formed like this have an excellent effect for enhancing surface cleaning of a material. In addition, the functional ions have excellent effects for enhancing adhesion in printing, coating, or inosculating by reforming a surface through microscopic foreign material removal, surface illuminance change, formation of polar functional group and so on.

However, additional gas supply facilities are necessary since at least 90% of researches for atmospheric plasma are conducted on a mini DBD or corona jet type plasma generator which uses helium or argon gas having relatively low discharge voltage and a consumption of helium or argon gas supplied for electric discharge is large. Accordingly, simplification of a system is required. Although research on atmospheric air plasma using air instead of gas for electric discharge is largely related to a DBD structure or an electrode structure of a torch type, these structures have a small gap between electrodes or a small cross section area for treatment of plasma. Therefore, a new electrode design is required to induce large area electric discharge while enhancing power efficiency.

Meanwhile, similarly to a flexible display technology, in the current plasma application technology area, a technology using flexible substrate departing from using a conventional planar electrode is required. This is due to a limitation in a volume or design of overall system arising from a design using a nonflexible electrode. At this time, however, in the case of a flexible electrode that discharges electricity in air, a dielectric material is damaged mostly by heat or design of an optimized electrode structure is difficult to achieve.

Korean Patent No. 10-1573231 discloses a technique relating to a plasma discharge performed by using a linear flexible electrode and to a system for electrically controlling plasma, and Korean Patent No. 10-1492864 relates to a packing material including a planar electrode capable of sterilizing by generating plasma.

In the case of a flexible electrode, when electric discharge is performed continually with a high voltage and a high output power, a packing material or a dielectric material itself is damaged by heat being accumulated between a dielectric material and an electrode, thereby resulting in a problem in durability and safety of plasma generator itself. Accordingly, a cooling function should be added or a disposition of electrodes having strong durability is necessary.

SUMMARY OF THE INVENTION

Accordingly, the present disclosure has been made keeping in mind the above problems occurring in the prior art, and an objective of the present disclosure is to resolve problems described above, thereby to design a flexible dielectric material and flexible electrodes to be disposed in a new type of arrangement and to be cooled as well.

The present disclosure to resolve problems described above provides: a flexible plasma generator including auxiliary support wires or auxiliary support fixtures supporting the central electrode all for which cooling is available, wherein the flexible plasma generator includes a central electrode having a circular cross section, a flexible dielectric material circumscribed about the central electrode, and a plurality of external electrodes, each having a circular cross section and being circumscribed about the flexible dielectric material while being separated from each other at regular intervals and forming a satellite shape when viewed cross-sectionally; and a flexible plasma generator that can be cooled and has a satellite shape when viewed cross-sectionally, wherein a cooling line is formed therein for temperature control, that is, for cooling the central electrode, the external electrode, the auxiliary support wires or auxiliary support fixtures.

According to an embodiment of the present disclosure described below, the temperature of an electrode itself can be controlled in a state in which a plasma is discharged, so it is possible to realize more efficient power control and plasma discharge, and to provide a plasma generator that is applicable for purposes such as sterilization, neutralization, treatment, beauty treatment, military use, and so on.

In addition, a method of type modification of the flexible dielectric material by introducing a cooling line capable of cooling and a method of effectively expanding the linear flexible electrode having self-cooling capability can be provided.

DESCRIPTION OF THE PREFERRED EMBODIMENTS

The present invention will be described in detail below with reference to the accompanying drawings. Repeated descriptions and descriptions of known functions and configurations which have been deemed to obfuscate the gist of the present disclosure will be omitted below.

Figure 1A:
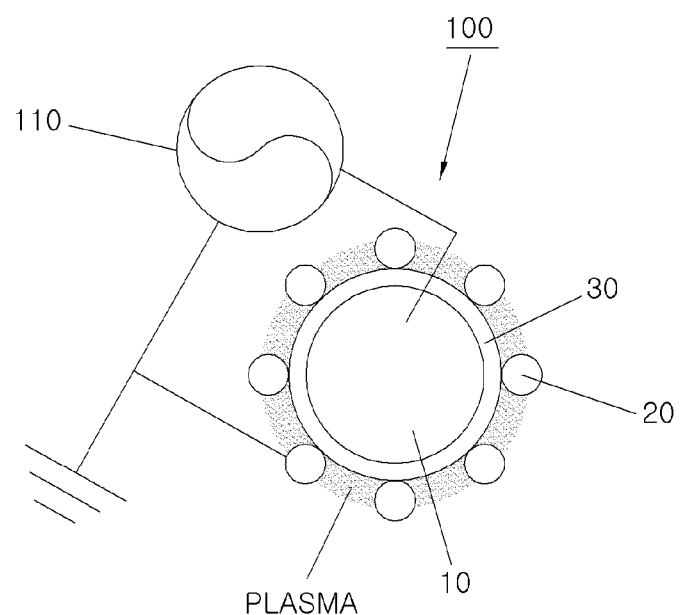
FIGS. 1A to 1C are schematic diagrams illustrating a cross sectional view and side views of a conventional flexible plasma generator.
Figure 1B:
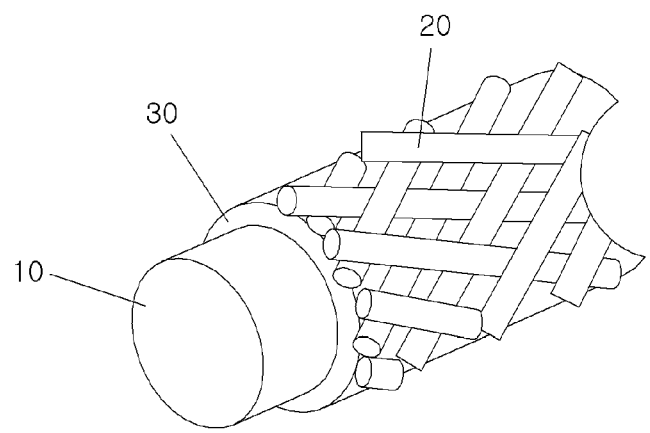
Figure 1C:
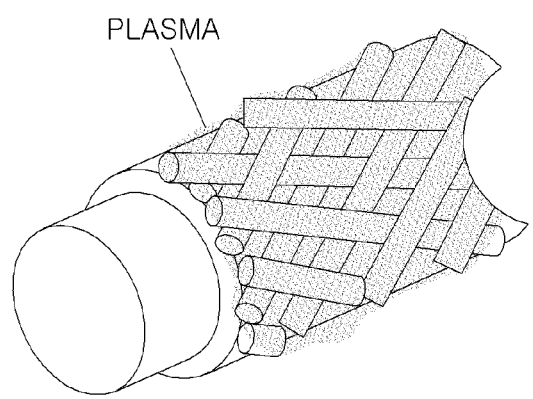

FIG. 1A is a cross sectional view of a flexible plasma generator, FIG. 1B is a side view, and FIG. 1C illustrates plasma response along with a peripheral of external electrodes.

A linear flexible plasma generator 1 has a similar shape to a coaxial cable and encloses central electrodes 10 with a flexible dielectric material 30. By allowing an external electrode 20 to enclose a circumference of the flexible dielectric material 30 by adjusting braiding ratio, wherein the external electrode 20 is grounded, the linear flexible plasma generator 30 becomes satellite-shaped when viewed cross-sectionally, whereby the external electrode material 20 encloses central electrodes 10 with the dielectric material 30 therebetween. When a high voltage of an alternating current waveform or pulse type waveform from a power source 110 is applied to central electrodes 10 and external electrodes 20, plasma can be discharged. At this time, an air plasma can be obtained when a voltage of about several kV with a frequency of several kHz is applied. However, when the plasma is discharged continually, a surface of the electrode becomes hot due to effects such as resistance of the electrodes, capacitance and impedance of a plasma reactor, and a temperature rise of plasma gas due to air ionization of the plasma.

Figure 2A:
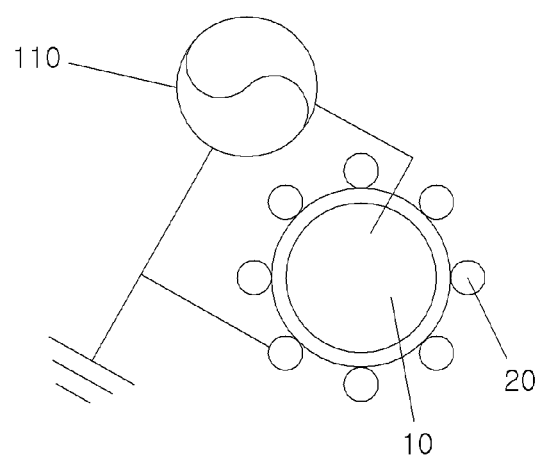
FIGS. 2A and 2B are schematic diagrams illustrating a flexible plasma generator capable of being modified or expanded in shape by using a woven or braided support fixture.
Figure 2B:
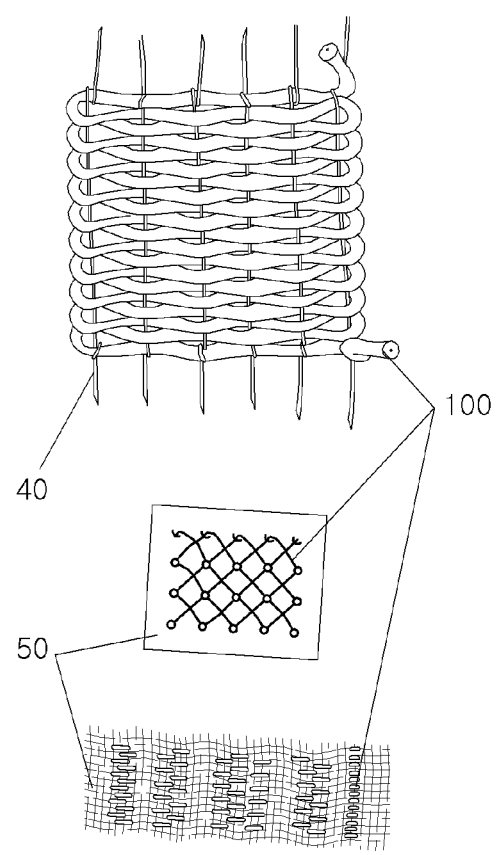

The top portion of FIG. 2B is a drawing illustrating auxiliary support wires 40 being weaved or braided in order to allow a shape of the linear flexible plasma generator 100 in FIG. 2A to be modified or expanded. The bottom of FIG. 2B is a drawing illustrating an auxiliary support mat 50 being punched for the linear flexible electrode plasma generator 100 being able to be inserted.

That is, FIG. 2A is the flexible plasma generator represented by a one dimensional linear structure and, by using this, modification to two dimensional planar type or three dimensional stereoscopic type as in FIG. 2B, is possible. At this time, for weaving by using auxiliary support wires, auxiliary support fixtures, or an auxiliary support mat (the mat with a fixed volume in which an aqueous solution or air is inserted and perforations equally provided on a part of the surface), the shape of the linear flexible plasma generator can be modified.

As a length of the flexible plasma generator becomes longer, a total of impedance value increases, whereby more heat may be generated. Obviously, heat on surface of electrodes can be controlled through electrical control. However, as a method to control heat more efficiently, direct cooling by cooling water may be taken into consideration.

Figure 3A:
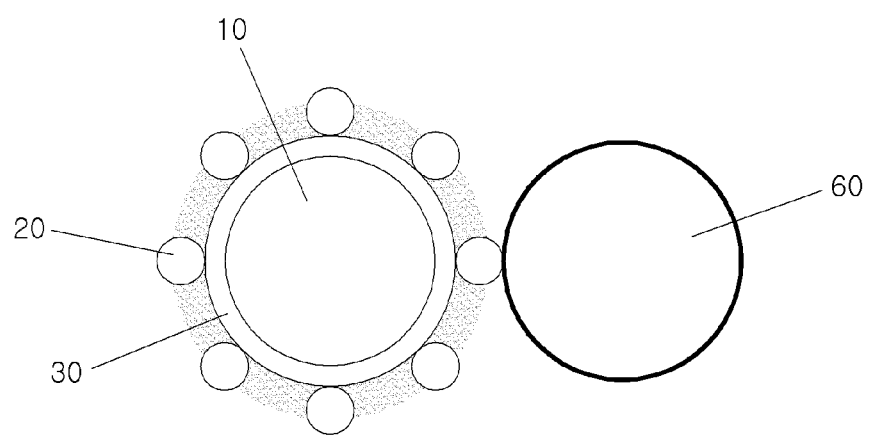
FIGS. 3A and 3B are schematic diagrams illustrating cooling possibility by replacing support fixtures of cooling lines when the shape is modified through weaving as in FIGS. 2A and 2B.
Figure 3B:
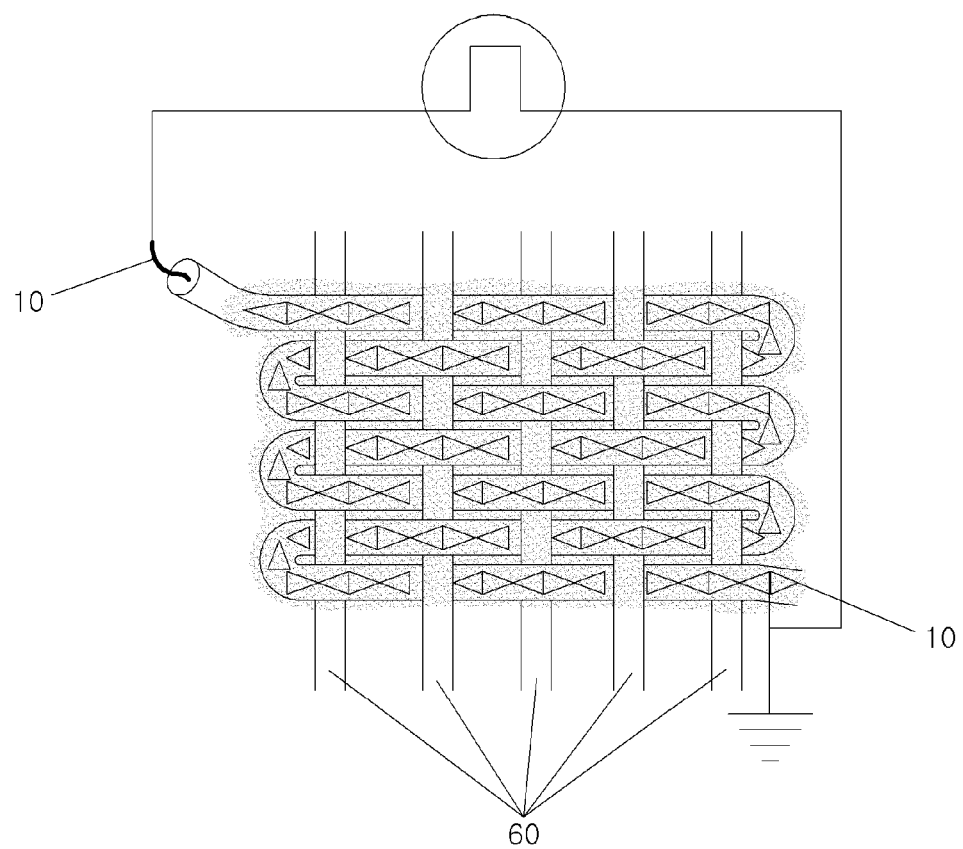

FIG. 3A is a conceptual diagram illustrating a cooling line adjacent to the flexible plasma generator represented by one dimensional linear structure, FIG. 3B is a drawing illustrating cooling lines 60 replacing the auxiliary support wires 40 for weaving or braiding as in FIG. 2B. When the structure is modified through weaving, cooling is possible by replacing auxiliary support fixtures with cooling lines.

That is, as a method to resolve a problem of heat generated as the length of the flexible plasma generator becomes long, the auxiliary support fixtures or auxiliary support wires are replaced with cooling lines or a cooling pad. At this time, cooling lines or the cooling pad exercise a cooling effect at the part of the linear flexible plasma generator they come into contact with, whereby relatively easy control is possible compared with the conventional art. Although cooling lines are used in FIG. 3B, a cooling pad being punched as in the bottom portion of FIG. 2B may also be used.

Figure 4A:
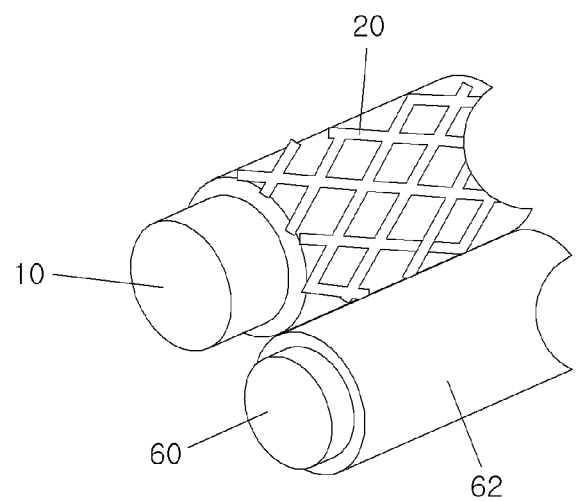
FIGS. 4A to 4D are schematic diagrams illustrating a method of weaving the cooling lines in parallel or perpendicularly in a case of weaving as in FIGS. 3A and 3B.
Figure 4B:
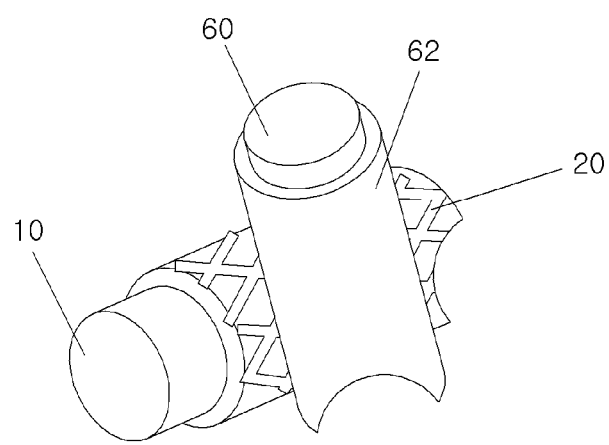
Figure 4C:
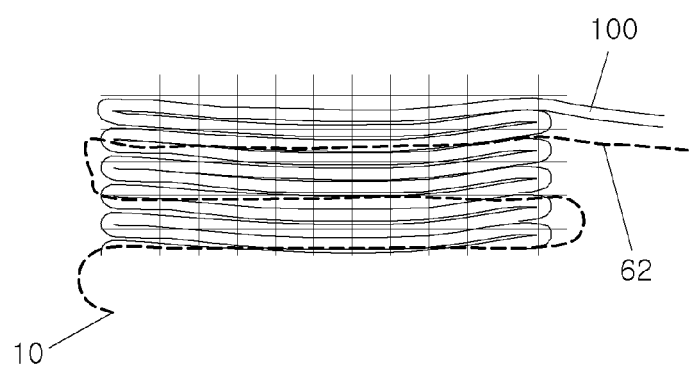
Figure 4D:
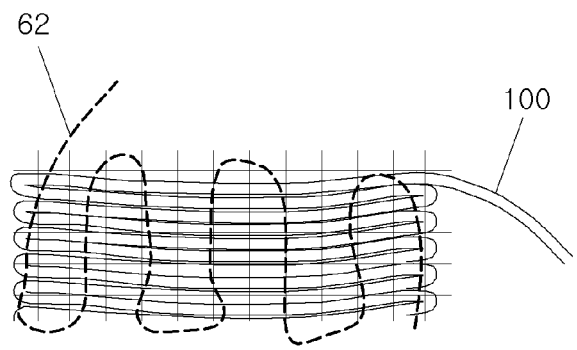

FIG. 4A is a drawing illustrating that the linear flexible electrode plasma generator and cooling lines 60 covered with fabrics 62 are in parallel, and FIG. 4B is a drawing illustrating that the linear flexible electrode plasma generator and the cooling lines are disposed orthogonally. That is, in order to cool the linear flexible electrode plasma generator, the cooling lines may be weaved in parallel or weaved perpendicularly. When the cooling line is weaved in parallel, the cooling line is weaved in parallel with the linear flexible electrode plasma generator like the auxiliary support wire as in FIG. 4C. When the cooling line is weaved perpendicularly, the cooling line is weaved perpendicularly with the linear flexible electrode plasma generator like the auxiliary support wire as in FIG. 4D. The cooling lines may be used together with the existing auxiliary support wire in parallel or may replace the auxiliary support wire when weaved around the flexible electrode plasma generator.

Figure 5A:
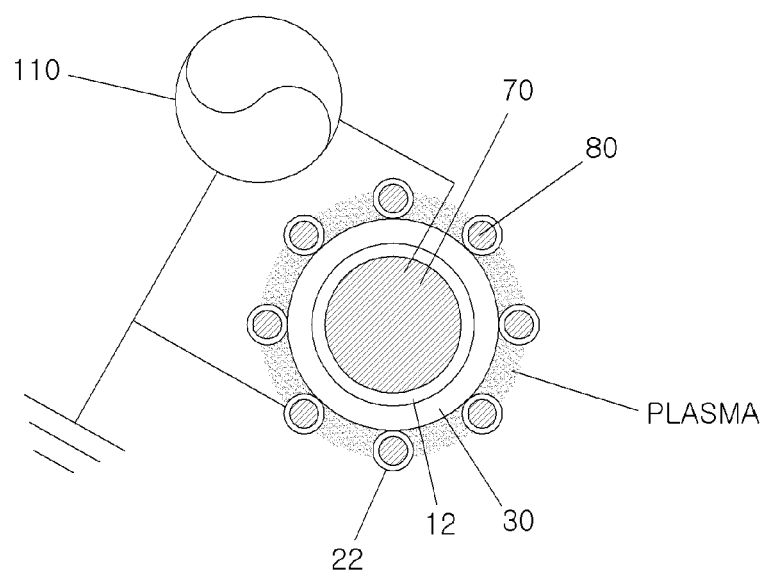
FIGS. 5A and 5B are schematic diagrams illustrating a cross sectional view and a side view, respectively, of a structure capable of cooling each electrode by replacing the flexible plasma generator in FIGS. 1A to 1C.
Figure 5B:
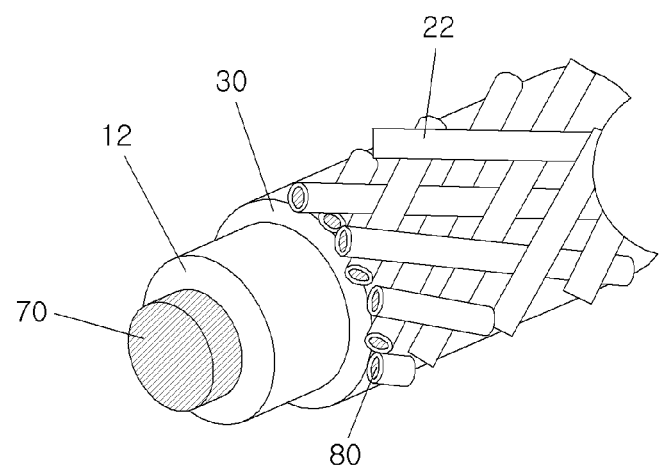

FIG. 5A is a drawing illustrating a structure that is applied to cool both the central electrodes 10 and the external electrodes 20 of the linear flexible electrode plasma generator in FIG. 1A, wherein both the central electrodes and the external electrodes are allowed to be tube types and each applies cooling water to the inside of tubes. That is, the central electrodes 10 become a central tube electrode 12 and the external electrodes 20 an external tube electrode 22, and cooling water for the central tube electrode 70 and cooling water for the external tube electrode 80 are applied to each of the central tube electrode 12 and the external tube electrode 22, respectively. FIG. 5B is a drawing of side view.

Meanwhile, the central tube electrode 12 may be composed of a few tubes, and is not limited to one tube as in FIG. 5A.

Figure 6A:
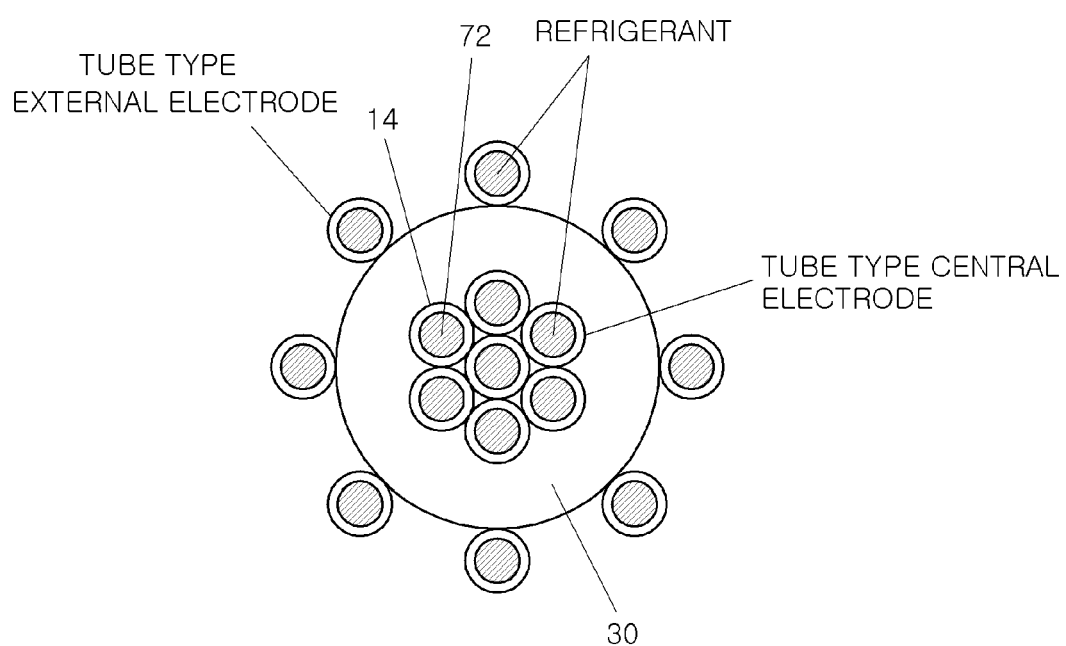
FIGS. 6A and 6B are schematic diagrams illustrating that a central electrode is composed by gathering several internal tube electrodes in the structure as in FIGS. 5A and 5B.
Figure 6B:
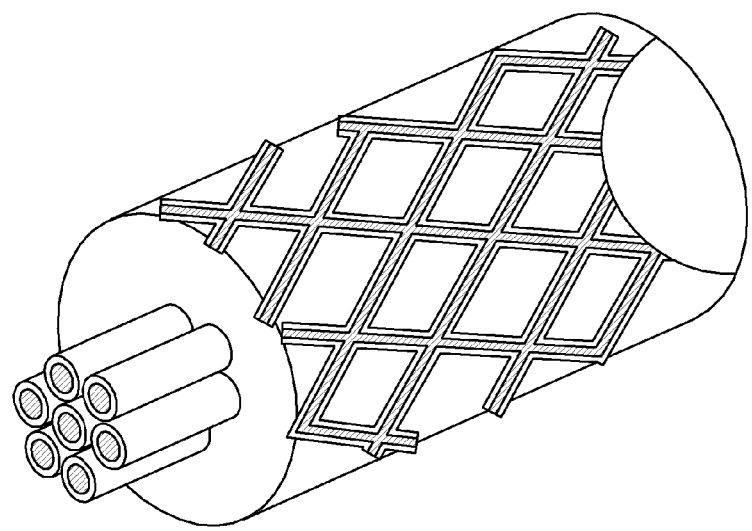

FIG. 6A is a drawing illustrating that a central electrode is composed by gathering several internal tube electrodes 14 and several tube electrodes gathered in a radial shape substitute the central electrodes 10. In a center of the tube electrodes composing a radial shape, a central electrode may be additionally formed. FIG. 6b is a drawing illustrating the side view of the central tube electrodes gathered in a radial shape.

Figure 7A:
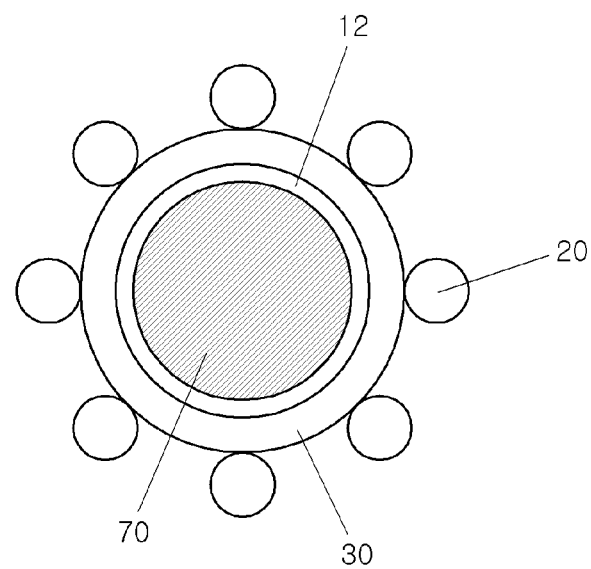
FIGS. 7A and 7B are schematic diagrams illustrating an embodiment of a state of cooling a core electrode part in the structure as in FIGS. 5A and 5B.

FIG. 7A is a drawing illustrating that a cooling line is formed at the inside of a tube electrode in order to cool only a central electrode, wherein the central electrode is composed of one central tube electrode 12.

Figure 7B:
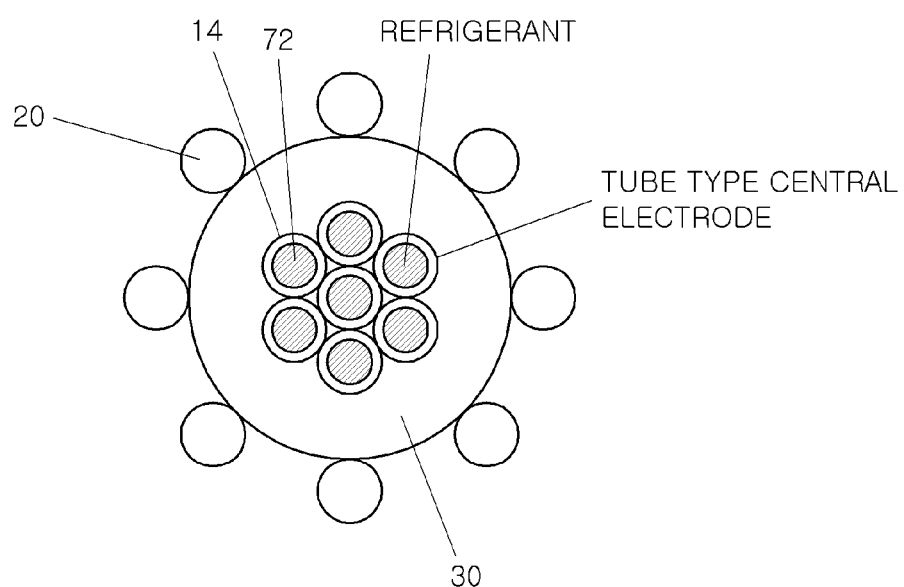

FIG. 7B is a drawing illustrating that a cooling line 72 is formed at the inside of an internal tube electrode 14 in order to cool only central electrodes, wherein the central electrode is formed with a plurality of the internal tube electrodes 14 in a radial shape.

Figure 8A:
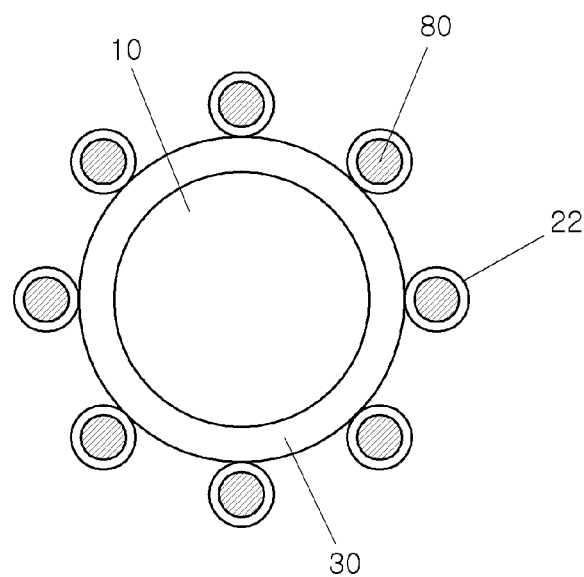
FIGS. 8A and 8B are schematic diagrams illustrating an embodiment of a state of cooling only an external electrode part in the structure as in FIGS. 5A and 5B.

FIG. 8A is a drawing illustrating that a cooling line is formed at the inside of a tube electrode in order to cool only external electrodes while the central electrode remains as it is on the contrary to FIG. 7A, wherein the external electrode is composed of a plurality of the external tube electrodes 22.

Figure 8B:
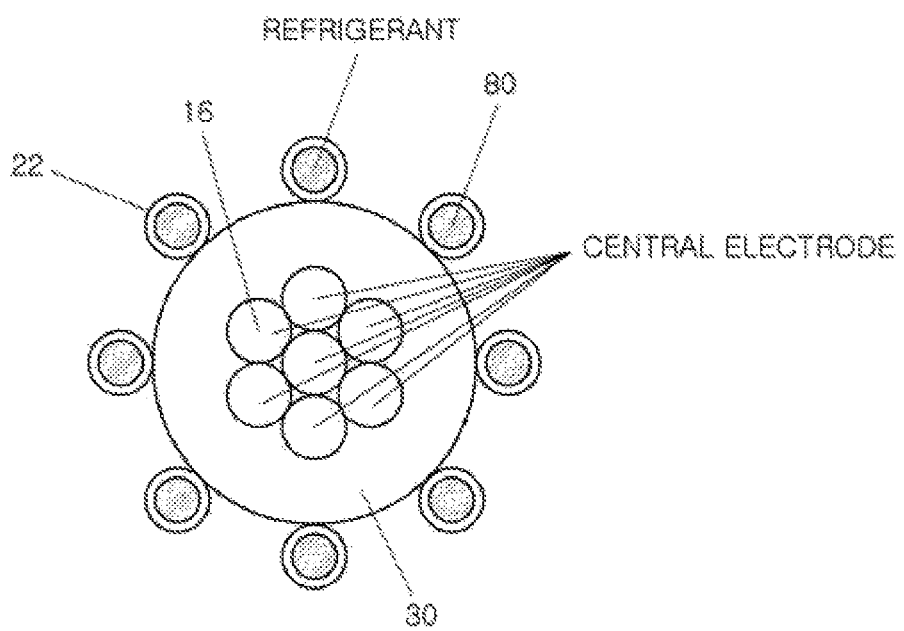

FIG. 8B is a drawing illustrating that a central electrode is not one electrode having a circular cross section, but is formed in a radial shape by gathering the internal tube electrodes 16 composing of a plurality of circular cross sections. On the other hand, FIG. 8b is a drawing illustrating that a cooling line is formed at the inside of a tube electrode, wherein the external electrode is composed of a plurality of the tube electrodes in order to cool the external electrodes.

Figure 9A:
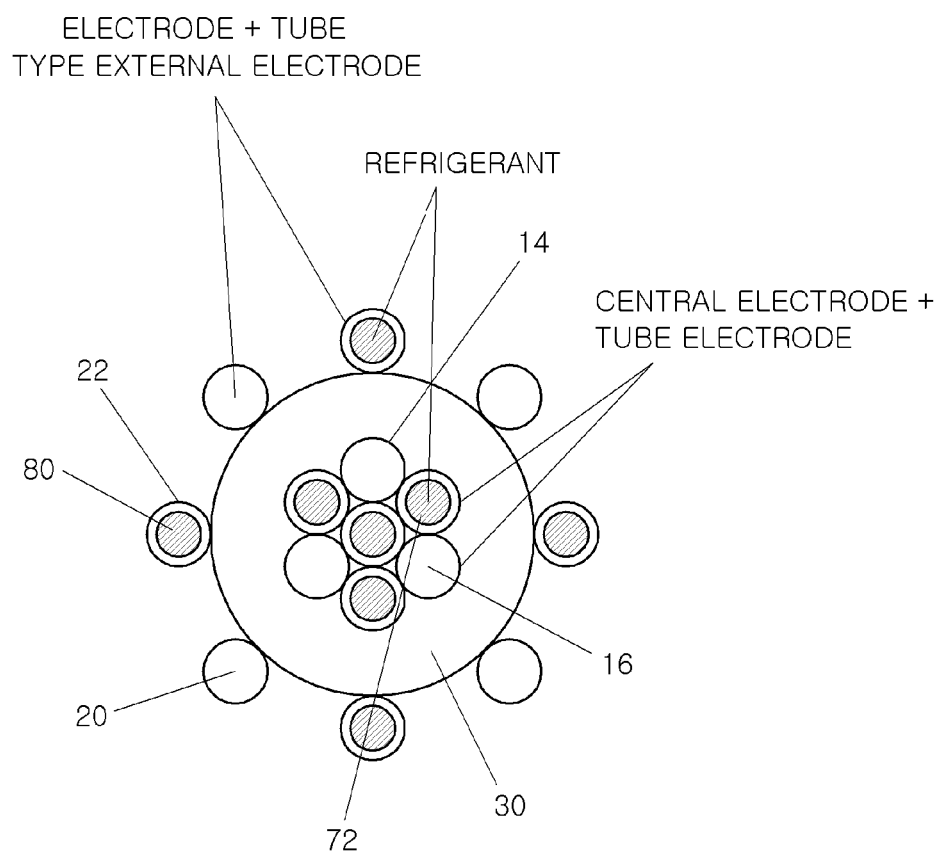
FIGS. 9A and 9B are schematic diagrams illustrating an embodiment of a state of cooling only a part of core electrodes or external electrodes in the structure as in FIGS. 5A and 5B.
Figure 9B:
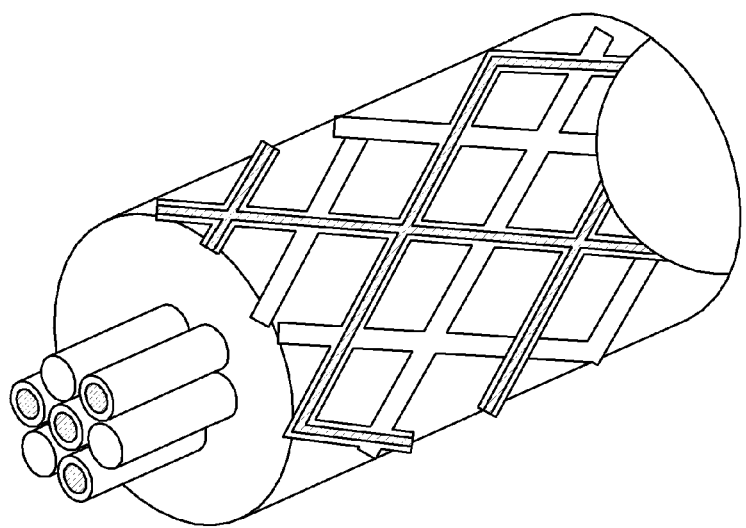

FIG. 9A is a drawing illustrating a flexible plasma generator including: central electrodes each having a circular cross section; a flexible dielectric material circumscribed about the central electrodes, and a plurality of external electrodes, each having a circular cross section and being circumscribed about the flexible dielectric material while being separated from each other at regular intervals. In the flexible plasma generator, cooling is possible to include auxiliary support wires or auxiliary support fixtures supporting the central electrodes, some of the central electrodes are composed of internal tube electrodes 14 and cooling lines may be formed therein, and some of the central electrodes may be composed of internal electrodes 16 each having a circular cross section. The external electrodes may be partly composed of external electrodes 20 and external tube electrodes 22, whereby cooling lines 80 may be formed at the inside of the external tube electrodes. FIG. 9B is a drawing illustrating a side view.

A surface of the external electrode of flexible electrodes may be configured as a corrugated structure or a nanostructure suitable for cooling, and a surface of the dielectric material, an auxiliary support wire, or an auxiliary support fixture may be a Bi—Te, Pb—Te, TAGS (Te—Ag—Ge—Sb), Co—Sb (skutterudite) based thermoelectric material. Any one of water, ethanol, and gas may be included as a coolant along the cooling line.

In the case of a tube that can be cooled, the tube itself may be used as an electrode since the conductive coating is implemented on the tube. Water, ethanol, gas, or conductive ink which is controllable between −30° C. to 100° C. may be included as a refrigerant supplied to the tube that can be cooled. It is possible to allow conductive liquid, liquid including metal, or gas to be used, and a medium used as a refrigerant may be circulated. An auxiliary support wire that can be cooled exists as a tube type and an auxiliary support fixture (auxiliary support mat) is punched with a plurality of perforations to be easily coupled with the linear flexible electrode. The auxiliary support fixture is divided into the number of fixed sections, and may be expanded by coupling sides which are located at the outermost side thereof and subtending each other.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. A satellite-shaped flexible plasma generator comprising:
 a central electrode having a circular cross section;
 a flexible dielectric material enclosing the central electrode; and
 at least one external electrode having a circular cross section and being circumscribed about the flexible dielectric material while being separated from each other at regular intervals,
 wherein the central electrode forms a two dimensional or three dimensional structure by using auxiliary support wires or auxiliary support fixtures, and
 wherein a cooling line is provided in auxiliary support wires or auxiliary support fixtures to be perpendicular to the central electrode.

2. The satellite-shaped flexible plasma generator as set forth in claim 1, wherein the cooling line is provided at the inside of the auxiliary support wires or the auxiliary support fixtures.

3. The satellite-shaped flexible plasma generator as set forth in claim 1, wherein the circular cross section of each electrode is an elliptical type or a flat type.

4. The satellite-shaped flexible plasma generator as set forth in claim 1, wherein a surface of the external electrode is configured as a corrugated structure or a nanostructure suitable for cooling.

5. The satellite-shaped flexible plasma generator as set forth in claim 1, wherein a Bi—Te, Pb—Te, TAGS (Te—Ag—Ge—Sb), or Co—Sb (skutterudite) based thermoelectric material for cooling is included in at least one of an auxiliary support wire, an auxiliary support fixture, and an auxiliary support mat being in contact with a surface of the dielectric material or with the central electrode.

6. A satellite-shaped flexible plasma generator comprising:
 a central tube electrode having a circular cross section;
 a flexible dielectric material enclosing the central tube electrode; and
 at least one external electrode having a circular cross section and being circumscribed about the flexible dielectric material while being separated from each other at regular intervals,
 wherein a cooling line is provided at the inside of the central tube electrode.

7. A satellite-shaped flexible plasma generator comprising:
 a central electrode having a circular cross section;
 a flexible dielectric material enclosing the central electrode; and at least one external electrode having a circular cross section and being circumscribed about the flexible dielectric material while being separated from each other at regular intervals, wherein the central electrode forms a two dimensional or three dimensional structure by using auxiliary support wires or auxiliary support fixtures, and wherein a cooling line is provided in auxiliary support wires or auxiliary support fixtures to be parallel to the central electrode.

8. The satellite-shaped flexible plasma generator as set forth in claim 7, wherein the cooling line is provided at the inside of the auxiliary support wires or the auxiliary support fixtures.

9. The satellite-shaped flexible plasma generator as set forth in claim 7, wherein the circular cross section of each electrode is an elliptical type or a flat type.

10. The satellite-shaped flexible plasma generator as set forth in claim 7, wherein a surface of the external electrode is configured as a corrugated structure or a nanostructure suitable for cooling.

11. The satellite-shaped flexible plasma generator as set forth in claim 7, wherein a Bi—Te, Pb—Te, TAGS (Te—Ag—Ge—Sb), or Co—Sb (skutterudite) based thermoelectric material for cooling is included in at least one of an auxiliary support wire, an auxiliary support fixture, and an auxiliary support mat being in contact with a surface of the dielectric material or with the central electrode.

12. The satellite-shaped flexible plasma generator as set forth in claim 6, wherein a cooling line is provided at the inside of the external electrode.

13. The satellite-shaped flexible plasma generator as set forth in claim 6, wherein the central tube electrode is composed of at least one internal tube electrode having a circular cross section.

14. The satellite-shaped flexible plasma generator as set forth in claim 6, wherein the external electrode is an external tube electrode provided with a cooling line therein.

15. A satellite-shaped flexible plasma generator comprising:

at least one internal electrode having a circular cross section and located at a predetermined distance from a center;

at least one internal tube electrode having a circular cross section and located at a predetermined distance from the center;

a flexible dielectric material enclosing the internal electrode or the internal tube electrode; and at least one external electrode having a circular cross section and being circumscribed about the flexible dielectric material while being separated from each other at regular intervals, wherein a cooling line is provided at the inside of the internal tube electrode.

16. The satellite-shaped flexible plasma generator as set forth in claim 15, wherein some of the external electrodes are external tube electrodes provided with cooling lines therein.

* * * * *